United States Patent Office 3,303,488
Patented Feb. 7, 1967

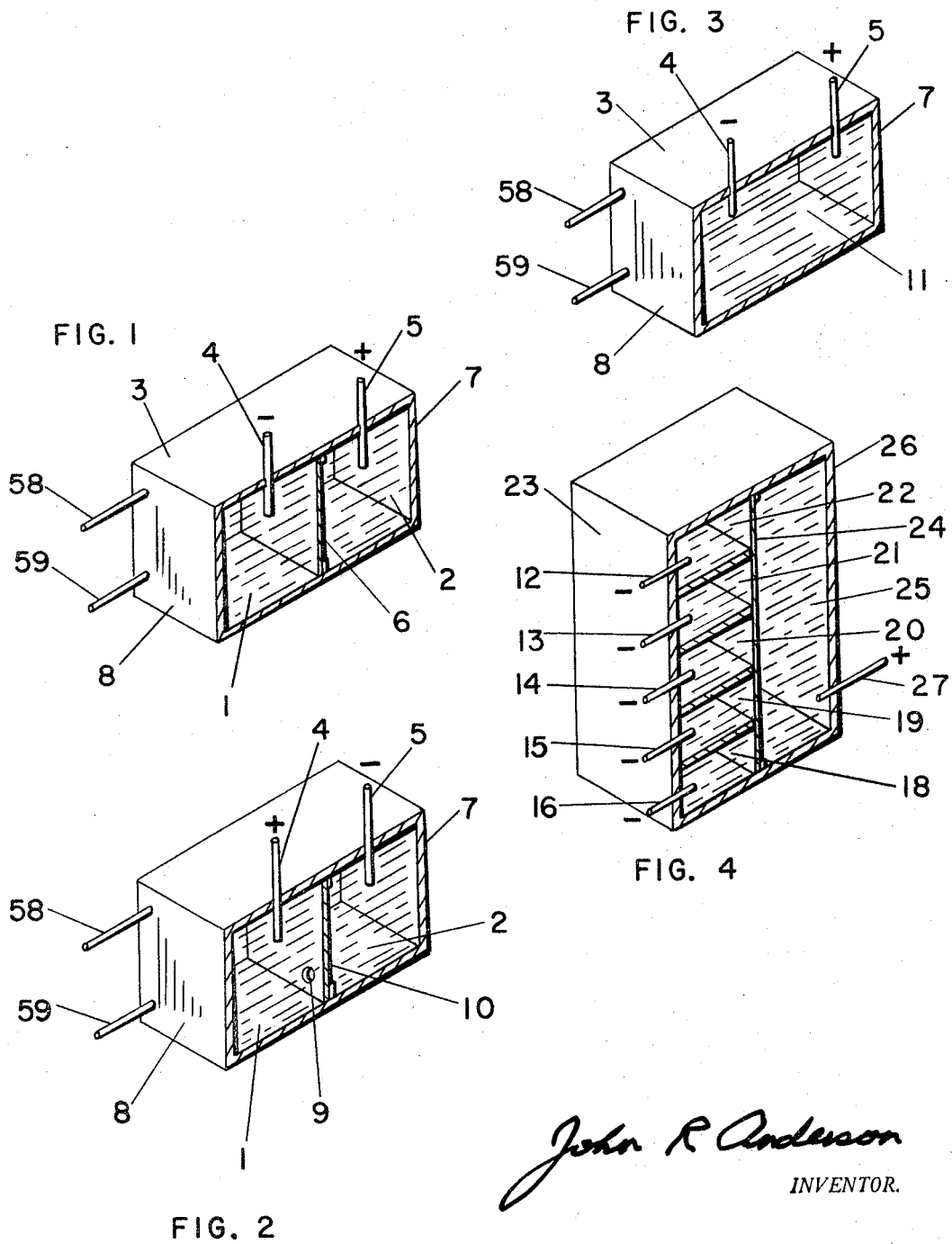

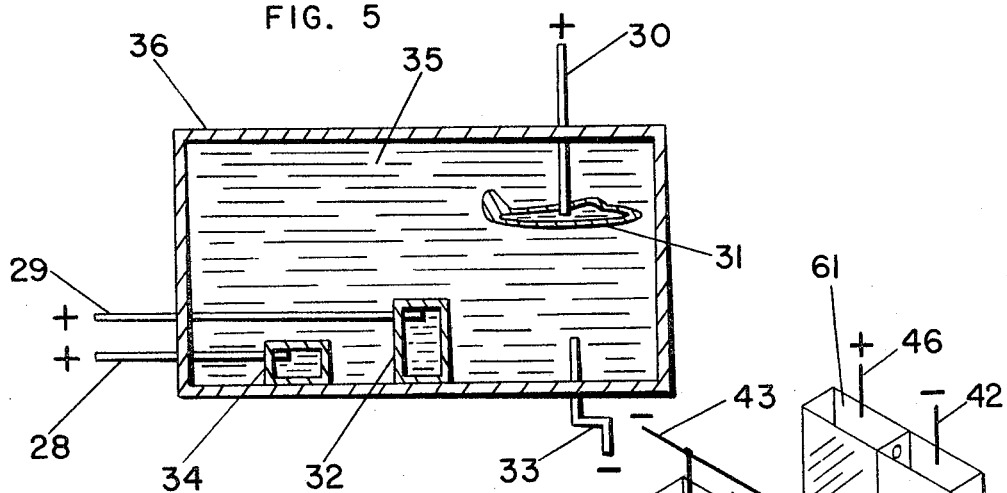
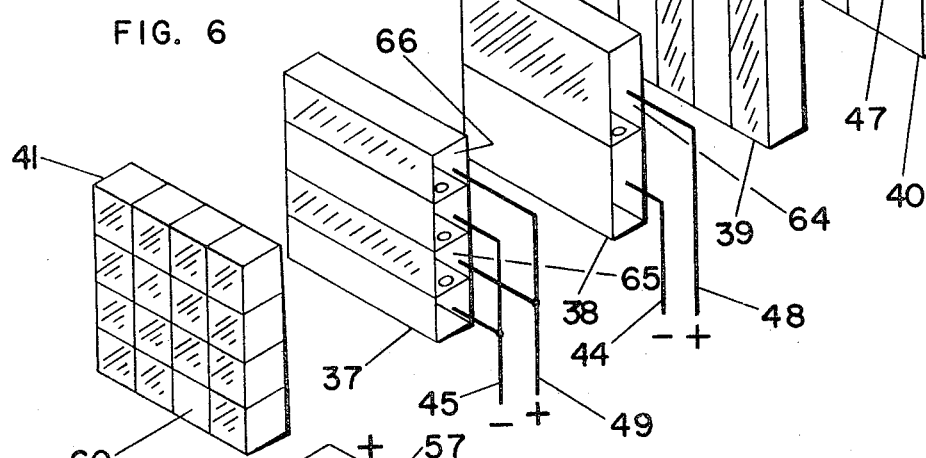

3,303,488
ELECTRO-OPTIC INFORMATION DISPLAY DEVICE UTILIZING AN ACID-BASE INDICATOR
John R. Anderson, Lutherville, Md., assignor to Electroscope Research, Inc., a corporation of Maryland
Filed Feb. 11, 1963, Ser. No. 257,422
5 Claims. (Cl. 340—324)

This invention relates in general to a novel cell device which exhibits color changes by electrical means and more particularly to commercial applications of the device containing novel embodiments thereof. The object of this invention is to create a device that will present electronic information in a new way. Some present types of prior art display are: cathode ray tubes, electroluminescent devices, electro-mechanical devices and electro-depositing devices.

Devices of this invention are useable in applications similar to those of the more conventional devices. The cell device of this invention has color changing, memory, third dimension, electrical feedback and decoding capabilities. To accomplish this task the cell of this invention was devised to provide changes in color on electrical demand. By suitably combining and varying the arrangement of a number of the cells of this invention relative to each other so that light may still impinge on or pass through in different areas, a variety of pictorial type information can be presented.

The general behaviour of the cell of this invention uses the known phenomena that when two electrodes in an electrolytic solution are oppositely charged there is an altering of the concentration of anions or cations in the vicinity of the poles. This makes the electrolyte appears more basic or acidic at the pole vicinities corresponding to a surplus or deficiency of electrons. Common chemical acid-base indicators transform through different colors with a change from basic to acidic conditions and therefore these changes are here obtained from electric charges placed at the poles. The electrical conductivity of the solution will be in accordance with conductometric titration curves as used in chemistry.

The cell device herein described utilizes these principles in a new application.

A cell device of this invention comprises chiefly: a sealed gas and liquid tight enclosure, an electrolyte that permits light to pass through, electrodes, reversible color-responsive materials, other inhibiting materials and methods to inhibit ionic migration in the electrolyte, and transparent or translucent surfaces where required to observe the color change phenomena.

The sealed enclosure of the cell of this invention can be made of common plastics and/or glass, which are easily made transparent in the appropriate places to allow the color changes to be observed and which do not react with the electrolytes used in the cell. Sealing of the cell device gas and liquid tight prevents irreversible changes or losses of material. The best enclosure material used to date is acrylic plastic because of its clearness and ease of manufacture.

The electrolyte is transparent or translucent. An advantage of this invention is that many common electrolytes can be used. When the electrolyte is combined with materials hereafter described it is referred to as a "medium." The best electrolyte used to date is sodium phosphate dissolved in water because it does not attack many electrode materials.

The electrode materials of this invention can be made of common metals providing the electrodes are not soluble in the electrolyte but the life of the electrodes is improved and/or the number of electrolytes that can be used is increased by the use of noble metals such as gold. The electrodes can be in the form of fine wires and also in the form of see-through thinly deposited gold if it is not advantageous to see the electrodes but if desired the electrodes can be shaped to be deliberately visible.

The color-responsive material in the cell of this invention can be most any of the reversible acid-base indicators used in chemical titrations. The said color indicators are tautomers which are weak organic acids or bases that exist in one or more structural forms of which at least one form is colored. The said indicators are added to the electrolyte and are used in substantially greater concentration than used in chemical titrations to create the light blocking effect. The best indicator used to date is phenolphthalein because of its intense color and ease of procurement.

One type of inhibiting material suitable for use in inhibiting ionic migration in the cells of this invention is a transparent or translucent dialytic membrane which slows down or prevents the passage of ions. The best dialytic membrane used to date is cellophane which shows selective permeability, being more permeable to anions than cations or reverse and because it is transparent. It is advantageous that other methods of inhibiting ionic migration such as making restricting passages between compartments of the cells can also be used. The addition of gels to the electrolyte also stabilize the ionic movement, and the addition of neutral salts or other electrolytes also alter the ionic movement.

Suitable electrical impulses cause at least one portion of the "medium" of the cell of this invention to become colorless, or less colored, and another portion to change through one or more colors or tints, acquire a color or to reverse any of these processes in said portions of the "medium." The device is color stable in the condition left by the electrical impulse for periods that can be modified from less than one second to greater than 100 hours by modifying the materials and methods as described in the preceding paragraph. The best voltage applied to date is 6 volts because it is an appropriate voltage that is easily available in electronic instruments.

Additional light blocking is obtained by external filtering using common light filtering techniques.

The shuttering speed of this invention can be conveniently controlled by: the size of the passage of the divider relative to the overall size of the divider, the overall size of the divider, the size of the compartments, the type of electrolytic solutions, the area of electrodes and the distance between the electrodes.

The cell of this invention has an electrical conductivity change which can be used for the verification of its condition, activation of other cells or other applications. The conductivity change is derived from the fact that there is a change in the anion or cation concentration in the vicinity of the poles. Some anions are more mobile than cations and vice versa thus changing the conductivity. The use of the conductivity change of this invention is enhanced by the use of compartments for the "medium" which give positive isolation of the "medium" in the vicinity of the poles.

The novel cell device lends itself to general variations in design some of which are illustrated in the accompanying drawing that shows various embodiments and illustrations. The figures of the drawing are symbolic of working laboratory type cells and do not attempt to show or limit the actual configuration of the cells that can be used in production applications.

Referring to the drawing:

FIGURE 1 is a vertical cross-sectional view through a cell device with a plurality of compartments separated by a dialytic membrane with an appropriate electrode to each of the compartments.

FIGURE 2 is a similar view which shows a cell with a plurality of compartments separated by an impervious wall and connected by a restricting communicating passage between compartments with an appropriate electrode to each of the compartments.

FIGURE 3 likewise shows a cell composed of a single compartment rather than a plurality of compartments and with the different electrodes connected to different portions of the single compartment.

FIGURE 4 likewise shows an embodiment of the cell of FIGURE 1 adapted for use as a see-through array device.

FIGURE 5 likewise shows an embodiment of the cell of FIGURE 1 adapted for use as a third dimensional display apparatus.

FIGURE 6 is an exploded view which shows an embodiment of the cell of FIGURE 2 adapted for use as a decoding apparatus.

FIGURE 7 is a vertical cross-sectional view which shows an embodiment of the cell of FIGURE 2 adapted for use as a direct reading apparatus.

The following paragraphs described the general operations of the cells of this invention.

The cell of FIGURE 1 has an electrolyte in compartment 1 that has a reversible color indicator added. The electrolyte of compartment 2 does not have a color indicator. The "mediums" are separated by a dialytic membrane 6. When the polarity of electrodes 4 and 5 is as shown in FIGURE 1, the "medium" of compartment 2 is colorless and the "medium" in compartment 1 is in its colorless form. Reversing the polarity of the electrodes 4 and 5 will cause no color change in cell compartment 2 but the color indicator in cell compartment 1 will change to its color form. Observation through the transparent end walls 7, 8, of enclosure 3 allows the color change to be seen from the exterior of the cell device. Thus when a light is passed through the entire cell from transparent end wall 8 through wall 7 or reversely from wall 7 through wall 8 and the polarities of the electrodes are reversed a color change from dark to clear is observed in said light passed through the device. Another reversing of the polarity removes the color. External filtering reduces the observed color change to an almost black condition when cell compartment 1 is in the dark condition and a color similar to that of the filter when cell 1 is at the clear condition and therefore a light shuttering effect is obtained. The color change is stable until signalled electrically. An additional pair of electrodes 58 and 59 are shown entering cell compartment 1. They carry no electrical charge, however when the resistance is measured by any of the means common to chemical conductometric measurements a change in resistance across electrodes 58 and 59 is detected whenever the cell compartment 1 goes through a color transition.

Referring to FIGURE 2 there is shown an embodiment of the cell of FIGURE 1 wherein a wall 10 impervious to liquids separates the cell chamber into compartments 1 and 2 and a common "medium" aforesaid is in both compartments 1 and 2. Connection for ionic flow between the compartments 1 and 2 is made through the restrictive communicative passage 9.

The "medium" is colorless in compartment 2 and colored in compartment 1 when the polarity is as shown in FIGURE 2. Reversing of the polarity reverses the color of the medium to a colorless condition in compartment 1 and a colored condition in compartment 2. The small passageway 9 restricts the color dilution of compartment 2 by liquid from compartment 1 for periods greater than 100 hours.

Referring to FIGURE 3 there is shown an embodiment of the cell device with the cell chamber in the form of a single compartment 11. The fluid "medium" aforesaid is deliberately made stable in a basic or acidic condition to a degree slightly greater than that described in connection with FIGURE 2. The poles 4 and 5 are kept at opposite ends of the single compartment 11 of the cell.

This form of cell is more advantageous where a temporary colored condition is required that will erase itself automatically by ionic migration in a given time. When a light is passed through transparent walls 7 and 8 a color appears to the observer every time the poles are reversed but disappears shortly after removal of the electrical signal due to rapid migration of ions.

Referring to FIGURE 4 there is shown an embodiment incorporating the cell device of FIGURE 1 wherein several cells of the type of FIGURE 1 are arranged in an array or pattern. In the array form of FIGURE 4 a common transparent "medium" aforesaid is used in one single compartment 25 which is common to the other compartments 18, 19, 20, 21 and 22 of the cell device chamber. A common transparent dialytic membrane 24 separates all of the individual compartments 18, 19, 20, 21 and 22 of the cell chamber from the common compartment 25 of the cell chamber. When the polarity of the electrodes 12, 13, 14, 15, 16 and 27 is as shown and the "medium" is identical to that of the corresponding cell compartments 1, 2 of FIGURE 1 no color is observed in any of the compartments, and light passes through from rear wall 26 through the front wall 23. Reversing of the polarity of electrode 27 and an individual electrode 12 of compartment 22 causes that compartment 22 to become dark. The similar color exhibiting process takes place for all the other cell compartments 21, 20, 19 and 18 when their electrode polarities are reversed. FIGURE 4 shows an illustration of a limited number of cell compartments in common to a single compartment 25 but there is no limit to the quantity of cells that can be arranged in combination in a row as shown or in a grid pattern in common with a single compartment 25. There is no limit to the quantity of cell devices and cell compartments electrically selected. Quantities of 300 or greater are usually required for a picture presentation.

Referring to FIGURE 5 there is shown an embodiment of the cell device of FIGURE 1 that lends itself well to third dimensional displays. Consider the lighted interior of a transparent bowl with appropriate backdrops. The bowl comprising transparent enclosure 36 and a single compartment 35 is filled with a transparent electrolytic liquid energized by electrode 33. Into this liquid is immersed the appropriate information in the form of fine wires or other visibly unnoticeable material surrounded by suitable transparent dialytic membrane material 31, 32, 34 each filled with a color active "medium" aforesaid. Energizing the appropriate electrodes 28, 29, 30 by current to the line to electrode 33 causes the solution around the said electrodes 28, 29, 30 to acquire a color and become visible from the exterior of the enclosure 36 but confined to the shape of the membranes 31, 32 and 34. The electrodes 28, 29, 30 are insulated until they reach the confines of the membranes 34, 32, 31 respectively.

Referring to FIGURE 6 there is shown an embodiment employing a plurality of the cells of FIGURE 2 in the form of a decoder. A transparent to opaque color change in the "medium" aforesaid is used. The opaque condition is denoted by shading. For descriptive purposes of FIGURE 6 each cell device is one 2″ x 2″ x ½″ thick and a plurality of these cell devices are arranged in a pattern adapted for decoding binary information to decimal. The sealed enclosure for each of the cell devices is, or may be, in part or all transparent. Four cell devices 37, 38, 39, 40 are stacked and light is employed behind the cells of the stack. In any given cell the light will pass through one-half only, the selection of which is made electrically. Cells 38 and 40 have two compartments. Cells 37 and 39 have four compartments. Cells 37 and 38 are rotated 90° with respect to cells 39 and 40. When cell compartments 61, 62, 63, 64, 65 and 66 are dark the result will be one ½″ x ½″ lighted grid 60 on screen 41. Each grid on screen 41 is designed to correspond to a decimal equivalent or a discreet position in the decimal system. A character can be applied directly to the grids or the light from the grid can be directed to some other presentation by simple piping or optical means. Changing of any cell polarity will move the lighted grid to another predetermined grid. Selection of the grids can be accomplished with five electrical inputs by making electrodes 42, 43, 44 and 45 common and altering the potential of electrodes 46, 47, 48 and 49 relative to common electrodes 42, 43, 44 and 45.

Referring to FIGURE 7 there is illustrated an embodiment for direct reading by means of a cell device as in FIGURE 2. One compartment 50 being behind the other 51, a readable symbol 52 is located on the insulated dividing wall 53 between the compartments 50 and 51. Observations are made visibly through the transparent window 54 of enclosure 55. The medium contained in the compartments is the same and is one that changes from a transparent to a near opaque condition when energized by the electrodes. One polarity of the electrodes 56 and 57 makes the forward compartment 51 clear and the symbol 52 visible. Opposite polarity color covers the symbol 52. The rear compartment 50 has equal and opposite changes but is not seen through window 54. It is usually desirable to hide the activities of one compartment of the cell and observe the activities of the other cell compartment in see-through applications of the cell device of FIGURE 2. This is done by connecting one single common compartment in common with a plurality of compartments for many cells and arranging the common compartment in a manner that is not noticeable to the viewer. Edge viewing of one compartment of the cell and face viewing of the other compartment of the cell is advantageously afforded by the cell.

The illustrations above described are simplified to show the principles of operation of the novel cell device of this invention. It will be manifest that the cell devices shown in FIGURES 1, 2, 3, are often interchangeable in their applications, and that an endless combination of their different cell devices may be employed in actual practice.

I claim:
1. An electro-optic display system comprising a closed fluid container having at least one light transmitting wall, a divider positioned within said container and dividing it into first and second compartments in communication with each other through said divider, partitions positioned within the second compartment forming a plurality of separate cells within said second compartment each communicating with said first compartment through said divider, a normally transparent electrolyte substantially filling said first compartment and said separate cells, an electrode operatively in contact with the electrolyte contained in said first compartment, a plurality of electrodes in operative contact respectively with the electrolyte contained in said separate cells, a pH indicator in the electrolyte contained in said separate cells, and means for applying an electric potential between the electrode of the first compartment and one or more of the electrodes in the said separate cells, whereby a color change is produced in the said separate cells through a change in color of the pH indicator responsive to the application of said electric potential.

2. The electro-optic system of claim 1 in which the divider is a dialytic membrane.

3. The electro-optic system of claim 1 in which the divider has one or more communicating passages therein.

4. The electro-optic system of claim 1 further characterized by a readable symbol positioned on the divider wall portion of one or more of the separate cells.

5. The electro-optic system of claim 1 in which at least one of said separate cells have additional electrodes in contact with the electrolyte having externally positioned terminal ends, whereby changes in resistance in the electrolyte on changes of quantities of hydroxyl or hydrogen ions in said cell cause changes in resistance across said electrodes which changes in resistance are measurable across said external terminal ends.

References Cited by the Examiner
UNITED STATES PATENTS

| 2,632,045 | 3/1953 | Sziklai | 88—107 X |
| 3,158,430 | 11/1964 | McNaney | 88—61 X |
| 3,219,993 | 11/1965 | Schwertz. | |

JEWELL H. PEDERSEN, *Primary Examiner.*

RONALD L. WIBERT, *Examiner.*

E. S. BAUER, *Assistant Examiner.*